United States Patent
Blum et al.

(10) Patent No.: US 8,999,491 B2
(45) Date of Patent: Apr. 7, 2015

(54) WET-STRENGTH CORRUGATED FIBERBOARD

(75) Inventors: Rainer Blum, Mannheim (DE); Gabriel Skupin, Speyer (DE); Hubertus Kröner, Neustadt (DE); Jurgen Keck, Speyer (DE)

(73) Assignee: BASF SE, Ludwigshafen (DE)

( * ) Notice: Subject to any disclaimer, the term of this patent is extended or adjusted under 35 U.S.C. 154(b) by 782 days.

(21) Appl. No.: 13/214,880

(22) Filed: Aug. 22, 2011

(65) Prior Publication Data

US 2012/0045622 A1    Feb. 23, 2012

Related U.S. Application Data

(60) Provisional application No. 61/375,877, filed on Aug. 23, 2010.

(51) Int. Cl.

| | | |
|---|---|---|
| B32B 3/28 | (2006.01) | |
| B32B 29/00 | (2006.01) | |
| B31F 1/28 | (2006.01) | |
| B32B 27/08 | (2006.01) | |
| B32B 27/10 | (2006.01) | |
| B32B 27/36 | (2006.01) | |
| D21H 27/10 | (2006.01) | |
| B32B 37/12 | (2006.01) | |
| B32B 37/15 | (2006.01) | |
| D21H 19/24 | (2006.01) | |
| D21H 19/28 | (2006.01) | |

(52) U.S. Cl.
CPC ............... B31F 1/2886 (2013.01); B32B 3/28 (2013.01); B32B 27/08 (2013.01); B32B 27/10 (2013.01); B32B 27/36 (2013.01); B32B 29/005 (2013.01); B32B 37/12 (2013.01); B32B 37/153 (2013.01); *B32B 2270/00* (2013.01); *B32B 2305/70* (2013.01); *B32B 2307/7163* (2013.01); *B32B 2317/12* (2013.01); *B32B 2317/127* (2013.01); *B32B 2398/20* (2013.01); D21H 19/24 (2013.01); D21H 19/28 (2013.01); D21H 27/10 (2013.01)

(58) Field of Classification Search
CPC .......... B32B 3/28; B32B 29/00; B32B 27/10; B32B 29/002; B32B 29/005; B32B 29/08; E04C 2/322; E04C 2/32; B65D 65/403; B65D 65/38
USPC .............. 428/181, 184, 186, 534, 535, 537.5; 229/939
See application file for complete search history.

(56) References Cited

U.S. PATENT DOCUMENTS

| | | | |
|---|---|---|---|
| 3,799,837 A | 3/1974 | Witnes et al. | |
| 5,817,721 A | 10/1998 | Warzelhan et al. | |
| 5,863,991 A | 1/1999 | Warzelhan et al. | |
| 5,880,220 A | 3/1999 | Warzelhan et al. | |
| 5,889,135 A | 3/1999 | Warzelhan et al. | |
| 6,018,004 A | 1/2000 | Warzelhan et al. | |
| 6,111,058 A | 8/2000 | Warzelhan et al. | |
| 6,114,042 A | 9/2000 | Warzelhan et al. | |
| 6,120,895 A | 9/2000 | Kowitz et al. | |
| 6,201,034 B1 | 3/2001 | Warzelhan et al. | |
| 6,258,924 B1 | 7/2001 | Warzelhan et al. | |
| 6,303,677 B1 | 10/2001 | Warzelhan et al. | |
| 6,353,084 B1 | 3/2002 | Warzelhan et al. | |
| 2002/0188071 A1* | 12/2002 | Bastioli et al. ............. 525/165 |
| 2011/0187029 A1 | 8/2011 | Dietrich et al. | |

FOREIGN PATENT DOCUMENTS

| | | | |
|---|---|---|---|
| CA | 2737582 A1 | 4/2010 | |
| DE | 2124092 | 12/1971 | |
| DE | 2842869 A1 | 4/1980 | |
| JP | 11236071 A | * 8/1999 | |
| JP | 2001047532 A | * 2/2001 | |
| WO | WO-92/09654 A2 | 6/1992 | |
| WO | WO-9615173 A1 | 5/1996 | |
| WO | WO-9615174 A1 | 5/1996 | |

(Continued)

OTHER PUBLICATIONS

English Translation of JP 11-236071; Otani et al; published Aug. 31, 1999.*

(Continued)

*Primary Examiner* — Catherine A Simone
(74) *Attorney, Agent, or Firm* — Drinker Biddle & Reath LLP

(57) ABSTRACT

The present invention relates to single face or double faced corrugated fiberboard comprising one or more corrugated plies, wherein at least one of the linerboard plies or corrugated plies is a paper-film assembly comprising:

i) a 30 to 600 g/m² grammage papery material of construction, ii) a biodegradable polymeric coating from 1 to 100 μm in thickness.

More particularly, the present invention relates to single face or double faced and/or corrugated fiberboard comprising one or more corrugated plies, wherein at least one of the linerboard plies or corrugated plies is a paper-film assembly comprising:

i) a 30 to 600 g/m² grammage papery material of construction as outer layer, ii) a biodegradable polymeric coating from 1 to 100 μm in thickness as interlayer, and iii) a 30 to 600 g/m² grammage papery material of construction as inner layer.

The present invention further relates to methods of producing this corrugated fiberboard.

12 Claims, No Drawings

(56) References Cited

FOREIGN PATENT DOCUMENTS

| | | |
|---|---|---|
| WO | WO-9615175 A1 | 5/1996 |
| WO | WO-9615176 A1 | 5/1996 |
| WO | WO-9621689 A2 | 7/1996 |
| WO | WO-9621690 A1 | 7/1996 |
| WO | WO-9621691 A1 | 7/1996 |
| WO | WO-9621692 A1 | 7/1996 |
| WO | WO-9625446 A1 | 8/1996 |
| WO | WO-9625448 A1 | 8/1996 |
| WO | WO-9812242 A1 | 3/1998 |
| WO | WO-2006/097353 A1 | 9/2006 |
| WO | WO-2006/097354 A1 | 9/2006 |
| WO | WO-2006/097355 A1 | 9/2006 |
| WO | WO-2006/097356 A1 | 9/2006 |
| WO | WO-2010/034712 A1 | 4/2010 |
| WO | WO-2011/054786 | 5/2011 |

OTHER PUBLICATIONS

English Translation of JP2001-047532; Sasazaki; published Feb. 20, 2001.*

* cited by examiner

WET-STRENGTH CORRUGATED FIBERBOARD

CROSS-REFERENCE TO RELATED APPLICATION

This application claims the benefit of U.S. Provisional Application Ser. No. 61/375,877 filed Aug. 23, 2010, the entire contents of which are incorporated herein by reference in its entirety.

FIELD OF THE INVENTION

The present invention relates to single face or double faced corrugated fiberboard comprising one or more corrugated plies, wherein at least one of the linerboard plies or corrugated plies is a paper-film assembly comprising:
i) a 30 to 600 g/m² grammage paper-based construction material,
ii) a biodegradable polymeric coating from 1 to 100 μm in thickness.

More particularly, the present invention relates to single face or double faced corrugated fiberboard comprising one or more corrugated plies, wherein at least one of the linerboard plies or corrugated plies is a paper-film assembly comprising:
i) a 30 to 600 g/m² grammage paper-based construction material as outer layer,
ii) a biodegradable polymeric coating from 1 to 100 μm in thickness as interlayer, and
iii) a 30 to 600 g/m² grammage paper-based construction material as inner layer.

The present invention further relates to methods of producing this corrugated fiberboard.

BACKGROUND

Polymer-coated paper-based products have numerous applications, more particularly in paper varieties whose ink jet printability can be improved by the polymeric coating, i.e., all graphic papers, natural papers, paperboard and cardboard. In all these applications, the surface of the paper-based construction material is altered, as is indeed desired for the abovementioned applications such as printability or barrier properties. Paper-based products coated with biodegradable polymer (blends) are known from WO2010/034712.

However, there are numerous applications where the surface properties of the paper are actually desired. In corrugated fiberboard production, the untreated surface of paper has distinct advantages. When the corrugated plies are produced on the so-called fluted rows, the untreated surfaces of paper do not adhere. On the other hand, untreated papery materials of construction have insufficient wet strength or oil resistance for numerous applications. Subsequent impregnation or waxing of the papers leads to issues in the recycling of the papery materials of construction.

German Laid-Open Specification DOS 2124092 describes wet-strength corrugated fiberboards having a corrugation with a paper/polyethylene/paper construction. This embodiment is disadvantageous in that the paper/polyethylene assembly is not simple to recycle using customary methods (e.g., deinking in the case of newspaper by the method described in EO 09174077.9).

BRIEF SUMMARY

The problem addressed by the present invention was accordingly that of providing corrugated fiberboard that has surface properties comparable to paper, but at the same time has wet strength, oil resistance, a higher moisture resistance and is also simple to recycle.

This problem is solved by the corrugated fiberboard of the present invention. The inner and outer surfaces are of an untreated paper-based construction material. The structural reinforcement resides in the interior of the assembly and improves the barrier properties such as moisture resistance, wet strength, water vapor resistance and oil resistance of the entire assembly.

The corrugated fiberboard of the present invention also has distinct advantages in recycling and can be recycled by the method described in EP 09174077.9. The corrugated fiberboard is initially charged in an aqueous wastepaper suspension which
a) is pulped in the presence of at least one hydrolase,
b) is pulped in an alkaline medium, and/or
c) is treated in an alkaline medium in a deinking process,
and the polymeric film is subsequently separated from the wastepaper suspension. The method is preferably carried out in only one of the described embodiments a), b) or c). But it is also possible to carry out any desired combinations of at least two embodiments. In general, however, one of the embodiments mentioned will be sufficient to achieve complete separation of biodegradable polymers from the papery fiber.

DETAILED DESCRIPTION OF THE PREFERRED EMBODIMENTS

Wastepaper and the recovery of the wastepaper from paper-based products are of particular economic significance in the paper industry, since resources (cellulosic pulp) can be protected in this way. The term "wastepaper" is based on German standard specification DIN 6730 and is accordingly defined as paper or paperboard which are to be recycled in used or unused form from production or processing and are to be returned as half-stuffs to a manufacturing process. In Germany alone, the wastepaper feed rate, i.e., the proportion of total domestic paper production accounted for by wastepaper, was 65% in 2003. Usually, wastepaper is used as a secondary raw material in paper and paperboard production. However, wastepaper cannot be recycled infinitely often. With every use cycle, the fibers are shortened by the mechanical stress and after about 4 to 6 cycles lose the ability to re-form into a sheet, and this in turn has adverse consequences for paper strength. Corrugated fiberboard production utilizes papers comprising new- and high-grade papery fibers. This is why the wastepaper fraction is very small in the case of corrugated fiberboard. We have now found that the proportion of wastepaper in the corrugated fiberboard of the present invention can be distinctly increased while at the same time the properties of the assembly such as the strength of the paper can be maintained at a high level. In the paper-based assembly it is the inner coating of polymer or rather polymeric sheet which assumes an important structural function.

The term "paper-based products" for the purposes of the present invention subsumes all species of paper and more particularly paperboard and cardboard.

As fibrous materials for producing these paper-based products there come into consideration all qualities customary for this purpose, e.g., mechanical pulp, bleached and unbleached chemical pulp, paper-based stocks from all annual plants and also wastepaper (also in the form of broke, both coated and uncoated). These fibrous materials can be used either alone or in any desired mixture with one another for the production of the pulps from which the paper-based products are produced. Mechanical pulp includes for example groundwood, thermomechanical pulp (TMP), chemothermomechanical pulp (CTMP), pressure groundwood, semichemical pulp, high-yield chemical pulp and refiner mechanical pulp (RMP). As chemical pulp there come into consideration for example sulfate, sulfite and soda pulps. Suitable annual plants for production of papery stocks are for example rice, wheat, sugarcane and kenaf.

The pulps are typically admixed with sizing agents in an amount of 0.01% to 3% by weight and preferably 0.05% to 1% by weight, solids in each case, based on dry paper stock, and they depend on the degree of sizing desired for the papers to be sized. The paper-based construction material may further comprise further substances, for example starch, pigments, dyes, optical brighteners, biocides, strength enhancers for paper, fixatives, defoamers, retention aids and/or drainage aids.

The central polymeric layer may comprise any biodegradable polymer customary for paper coating.

Biodegradable polymers are already known to a person skilled in the art and are disclosed inter alia in Ullmann's Encyclopedia of Industrial Chemistry (online-Version 2009), Polymers, Biodegradable, Wiley-VCH Verlag GmbH & Co. KG, Weinheim, 2009, pages 131. More particularly, the term "biodegradable polymers" for the purposes of the present invention subsumes: polylactic acid (PLA), polycaprolactone (PCL), polyhydroxyalkanoate (PHA), polyalkylene carbonate such as polypropylene carbonate (PPC) or polyethylene carbonate (PEC), chitosan and gluten and one or more polyesters based on aliphatic diols and aliphatic/aromatic dicarboxylic acids such as, for example, polybutylene succinate (PBS), polybutylene succinate adipate (PBSA), polybutylene succinate sebacate (PBSSe), polybutylene adipate-co-terephthalate (PBAT), polybutylene sebacate-co-terephthalate (PBSeT), polybutylene succinate-co-terephthalate (PBST). Also suitable are compounds of one or more of the biodegradable polymers mentioned with natural polymers, such as starch, glucose, oligomeric glucosene, cellulose, cellulose derivatives, lignins, chitosan, gluten, collagen, zein and copolyesters thereof.

As biodegradable polymers it is more particularly partly aromatic polyesters which are suitable for the central polymeric layer. By partly aromatic polyesters based on aliphatic diols and aliphatic/aromatic dicarboxylic acids are also meant polyester derivatives such as polyether esters, polyester amides or polyether ester amides. Partly aromatic polyesters include linear polyesters which are not chain extended (WO 92/09654 A1). Aliphatic/aromatic polyesters formed from butanediol, terephthalic acid and aliphatic $C_6$-$C_{18}$ dicarboxylic acids such as adipic acid, suberic acid, azelaic acid, sebacic acid and brassylic acid (as described in WO 2006/097353 to 56 for example) are suitable blending partners in particular. Preference is given to chain-extended and/or branched partly aromatic polyesters. The latter are known from documents WO 96/15173 to 15176, 21689 to 21692, 25446, 25448 or WO 98/12242, which are expressly incorporated herein by reference. Mixtures of different partly aromatic polyesters similarly come into consideration.

Partly aromatic polyesters particularly suitable for the central polymeric film are constructed as follows:

i) from 40 to 70 mo %, based on the components i to ii, of one or more dicarboxylic acid derivatives or dicarboxylic acids selected from the group consisting of succinic acid, adipic acid, sebacic acid, azelaic acid and brassylic acid, ii) from 60 to 30 mol %, based on the components i to ii, of a terephthalic acid derivative, iii) from 98 to 102 mol %, based on the components i to ii, of a $C_2$-$C_8$ alkylene diol or $C_2$-$C_6$ oxyalkylene diol, iv) from 0.00% to 2% by weight, based on the total weight of components i to iii, of a chain extender and/or crosslinker selected from the group consisting of a di- or polyfunctional isocyanate, isocyanurate, oxazoline, epoxide, carboxylic anhydride and/or a brancher capable of forming three ester and/or amide bonds at least, v) 0.00% to 50% by weight, based on the total weight of components i to iv, of an organic filler selected from the group consisting of native or plastified starch, natural fibers, woodmeal and/or of an inorganic filler selected from the group consisting of chalk, precipitated calcium carbonate, graphite, gypsum, conductivity carbon black, iron oxide, calcium chloride, dolomite, kaolin, silicon dioxide (quartz), sodium carbonate, titanium dioxide, silicate, wollastonite, mica, montmorillonites, talc, glass fibers and mineral fibers, and vi) from 0.00% to 2% by weight, based on the total weight of components i to iv, of at least one stabilizer, nucleator, slip and release agent, surfactant, wax, antistat, antifogant, dye, pigment, UV absorber, UV stabilizer or other plastic additive.

Partly aromatic polyesters of the abovementioned composition are supremely recyclable by the method described in EP 09174077.9, optionally in mixtures with polylactic acid.

Particularly suitable are partly aromatic polyesters having a melt volume rate (MVR) to EN ISO 1133 (190° C., 2.16 kg weight) of 5 to 50 cm$^3$/10 min, more particularly of 5 to 25 cm$^3$/10 min and more preferably of 5 to 12 cm$^3$/10 min.

Suitable for the central polymeric layer are further in particular the following copolymer mixtures of the composition:

(a) from 5% to 95% by weight, preferably from 30% to 90% by weight and more preferably from 40% to 70% by weight of a biodegradable, aliphatic-aromatic polyester, and (b) from 95% to 5% by weight, preferably from 70% to 10% by weight and more preferably from 60% to 30% by weight of one or more polymers selected from the group consisting of polylactic acid, polycaprolactone, polyhydroxyalkanoate, chitosan and gluten and one or more polyesters based on aliphatic diols and aliphatic/aromatic dicarboxylic acids such as, for example, polybutylene succinate (PBS), polybutylene succinate adipate (PBSA), polybutylene succinate sebacate (PBSSe), polybutylene terephthalate-co-adipate (PBTA) and (c) from 0% to 2% by weight of a compatibilizer.

Compatibilizers of group (c) are carboxylic anhydrides such as maleic anhydride and more particularly epoxy-containing copolymers based on styrene, acrylic esters and/or methacrylic esters. The epoxy-bearing units are preferably glycidyl(meth)acrylates. Epoxy-containing copolymers of the abovementioned type are marketed for example by BASF Resins B.V. under the Joncryl® ADR brand. Joncryl® ADR 4368 for example is particularly useful as compatibilizer.

Particularly preferred copolymer mixtures therefore comprise (a) from 20% to 90% by weight, preferably from 30% to 50% by weight and more preferably from 35% to 45% by weight of a biodegradable, aliphatic-aromatic polyester, (b) from 80% to 10% by weight, preferably from 70% to 50% by weight and more preferably from 65% to 55% by weight of one or more polymers selected from the group consisting of polylactic acid and polyhydroxyalkanoate, and (c) from 0% to 2% by weight of an epoxy-containing poly(meth)acrylate.

As polylactic acid of group (b) it is preferable to use one that has the following profile of properties:
- an MVR melt volume rate at 190° C. and 2.16 kg to EN ISO 1133 of 0.5 to 100 ml/10 min, preferably 5 to 70 ml/10 min and more preferably 9 to 50 ml/10 min,
- a melting point below 240° C.,
- a glass transition point (Tg) above 55° C.,
- a water content of below 1000 ppm,
- a residual monomer content (lactide) of below 0.3% by weight, and
- a molecular weight of above 10 000 daltons.

Preferred polylactic acids are for example NatureWorks® 6201 D, 6202 D, 6251 D, 3051 D and more particularly 3251 D (polylactic acid from NatureWorks). Polylactic acids may also comprise the sole polymeric substituent of the polymeric layer.

Polyhydroxyalkanoates of group (b) are primarily poly-4-hydroxybutyrates and poly-3-hydroxybutyrates, copolyesters of the aforementioned hydroxybutyrates with 3-hydroxyvalerates or 3-hydroxyhexanoate. Poly-3-hydroxybutyrate-co-4-hydroxybutyrates are known from Metabolix in particular. They are marketed under the trade name Mirel®. Poly-3-hydroxybutyrate-co-3-hydroxyhexanoates are known from P&G or Kaneka. Poly-3-hydroxybutyrates are marketed for example by PHB Industrial under the brand name Biocycle® and by Tianan under the name Enmat®.

The molecular weight $M_w$ of the polyhydroxyalkanoates is generally in the range from 100 000 to 1 000 000 daltons and preferably in the range from 300 000 to 600 000 daltons. The polyhydroxyalkanoates may also comprise the sole polymeric constituent of the polymeric film.

Polycaprolactone is marketed for example by Daicel under the product name Placcel®. It can be used in the polymeric layer alone or preferably in polymer blends. The polycaprolactone can be used as component b) or comprise the sole polymeric constituent of the polymeric layer.

Polyalkylene carbonate is to be understood as meaning more particularly polyethylene carbonate and polypropylene carbonate. Polyethylene carbonate is a polymer formed from ethylene oxide and carbon dioxide. Polypropylene carbonate is a polymer formed from propylene oxide and carbon dioxide. Polypropylene carbonate is particularly preferred and can be used in the polymeric layer alone or in combination with other biodegradable polymers.

It will be appreciated that other biodegradable polymers can also be used for the polymeric layer—alone or in admixture with other polymers. It will be found advantageous in this connection for these polymers likewise to have a high flowability.

For example, polylactic acid having a melt volume rate (MVR) to EN ISO 1133 (190° C., 2.16 kg weight) of 5 to 70 cm³/10 min, more preferably of 9 to 50 cm³/10 min and even more preferably of 5 to 25 cm³/10 min will be found to be an advantageous blending partner in such polymer blends. Blends of flowable polyesters with the aforementioned flowable polymer blends are also suitable for the paper coating.

As mentioned, the biodegradable aliphatic-aromatic polyesters and polymer blends are known from WO 2010034712. This document and the references cited therein is hereby expressly incorporated herein by reference not only for the composition of these polyesters but also for their methods of making.

The "biodegradable" feature shall for the purposes of the present invention be considered satisfied for any one material or composition of matter when this material or composition of matter has a DIN EN 13432 percentage degree of biodegradation equal to at least 90%.

The general effect of biodegradability is that the polymers and polymer blends (hereinafter also referred to as polymer (blends) for short) decompose within an appropriate and verifiable interval. Degradation may be effected enzymatically hydrolytically, oxidatively and/or through action of electromagnetic radiation, for example UV radiation, and may be predominantly due to the action of microorganisms such as bacteria, yeasts, fungi and algae. Biodegradability can be quantified, for example, by polymer (blends) being mixed with compost and stored for a certain time. According to DIN EN 13432, for example, $CO_2$-free air is flowed through ripened compost during composting and the treated compost subjected to a defined temperature program. Biodegradability here is defined via the ratio of the net $CO_2$ released by the sample (after deduction of the $CO_2$ released by the compost without sample) to the maximum amount of $CO_2$ releasable by the sample (reckoned from the carbon content of the sample) as a percentage degree of biodegradation. Biodegradable polymer (blends) typically show clear signs of degradation, such as fungal growth, cracking and holing, after just a few days of composting.

Other methods of determining biodegradability are described in ASTM D 5338 and ASTM D 6400-4 for example.

Corrugated fiberboard consists of one or two linerboard plies, the corrugated plies and, in the case of multi-ply species of corrugated fiberboard, of one or more interplies. Depending on the number of linerboard plies/interplies and corrugated plies present, single face corrugated fiberboard consists of one ply of corrugated paper adhered to paper or cardboard. Single-flute double faced corrugated fiberboard consists of one ply of corrugated paper adhered between two plies of paper and cardboard. Two-flute corrugated fiberboard consists of two plies of corrugated paper which are adhered together by a ply of paper or cardboard and the free outside surfaces of which are each likewise adhered to a ply of paper or cardboard. Corrugated fiberboard with more flutes has a similar construction. The strength/resistance properties are subdivided into varieties and can be reviewed in DIN 55468.

Sea transportation in particular utilizes corrugated fiberboards comprising a wet-strength adhesive and wet-strength papers. Wet-strength papers are either waxed or impregnated and/or body admixed with sizes or wet-strength resins. Papers endowed with wet strength in this way cannot be recycled. Recycling is prevented by the waxes or, respectively, sizes. Especially the kraft liners used for the linerboard plies and interplies have a low recycled content. On the other hand, it is especially for the production of the kraft liners that high- and new-grade paper fibers are used, and it would be economically very interesting to be able to recover these paper fibers.

The corrugated fiberboard of the present invention preferably includes, as corrugated ply and interply or else as linerboard ply, kraft liners having the construction paper-based construction material/polymeric layer comprising biodegradable polymers or preferably paper-based construction material/polymeric layer comprising biodegradable polymers/paper-based construction material.

The kraft liners used are preferably constructed as follows:
i) a 30 to 600 g/m², preferably 40 to 400 and more preferably 50 to 150 g/m² grammage paper-based construction material,
ii) a biodegradable polymeric coating from 1 to 100 μm, preferably 5 to 80 μm and more preferably 10 to 60 μm in thickness.

Particular preference is given to kraft liners having the following construction:

i) a 30 to 600 g/m², preferably 40 to 400 and more preferably 50 to 150 g/m² grammage paper-based construction material as outer layer,
ii) a biodegradable polymeric coating from 1 to 100 μm, preferably 5 to 80 μm and more preferably 10 to 60 μm in thickness as interlayer, and
iii) a 30 to 600 g/m², preferably 40 to 400 and more preferably 50 to 150 g/m² grammage paper-based construction material as inner layer.

The two- or more-layered paper assembly (kraft liner) is preferably produced using lamination and extrusion processes. An explicit reference shall be made in this connection to WO 2010/034712 and the processes described therein, including coextrusion processes.

It is additionally possible for the polymers or compounds to be extruded as a film. The methods of tubular film extrusion and chill-roll extrusion come into consideration here for film production.

In the case of thin layers, the application of a hotmelt also comes into consideration, as a special case of extrusion coating or dispersion application. This process is described in Ullmann, TSE Troller Coating. The hotmelt is pumped from a stock reservoir vessel preheated to about 150-200° C., into the die from which the surface application takes place. In the case of a wind-slot die, the paper web travels directly past the die lip at a high rate of speed. The gap, the web guidance, the web speed and the uniformity of the melt stream determine the quality of the polymeric layer. Coatings of 1 to 5 g/m² are customary—depending on the smoothness of the substrate. Very thin extrusion coatings can be applied in this way.

Dispersion coatings do not require any heating prior to application. The application technology is comparable to that of the hotmelt in the case of planar coatings. Web speeds are the highest at up to 3000 m/min. This means that dispersion coatings are also possible online on paper machines.

The coating with polymers such as polypropylene carbonate can also be effected using solutions of the polymers in alcohols for example.

Single- and multi-layered assemblies of paper-based and polymeric layers in every layer (corrugated layer or surface layer) are possible and sensible in order to minimize swelling of the cardboard layers.

The thickness of the polymeric layer in the corrugated web is not subject to any special restriction. The basis weight of the polymeric layer is in the range from 1 to 100 g/m² for example.

The paper-based layers of the corrugated web can utilize a wide variety of materials, for example white or brown kraft liner, half-stuff, wastepaper, corrugatable stock or ream wrappers. The thicknesses of these paper-based layers can vary within wide limits and be, for example, up to 300 g/m² or higher.

In general, the paper-film assembly has an overall thickness of 31 to 1000 g/m². A paper-film assembly of 80 to 500 μm is preferably obtainable by lamination and of 50 to 300 μm more preferably by extrusion coating.

The corrugated web thus obtained is then adhered in conventional manner with one or two linerboard webs to obtain single face or double faced corrugated fiberboard, although a doubled or triple corrugated fiberboard with two or three corrugated webs and one or, respectively, two intermediate linerboard webs is also possible of course.

The polymer-reinforced corrugated fiberboard produced according to the present invention has numerous advantages over conventional corrugated fiberboard:

The corrugated fiberboard has extremely high stack compression values, breaking strength and puncture resistance, especially after exposure to moist atmospheric conditions, are very greatly enhanced.

Bursting strength, especially after exposure to moist atmospheric conditions, is very greatly enhanced.

The corrugated ply can be produced in two stages. In this case, a first step comprises coating a paper web as described with a biodegradable and recyclable polymer by extrusion coating, hotmelt application or dispersion coating.

In the second step, one or more coated paper plies are fluted in a machine between 2 broad toothed wheels (fluting rolls) with wave-shaped teeth at about 100 to 200° C. and preferably at 160-180° C. at high speed to endow them with the typical wave shape. Shaping and conveying of the corrugated material are effected in one operation by the intermeshing toothed wheels.

Three-layered corrugated plies (paper/polymer/paper) can be produced from the already extruded or laminated kraft liners on conventional equipment using fluted rolls as described in German Laid-Open Specification DOS 2124092 for example. It is advantageous to produce the multi-layered corrugated web by heat sealing in one operation with the fluting on the corrugated fiberboard machine (see DE 2842869).

When a polymeric layer is at the surface, the polymer may stick to the fluting teeth. In this case, the polymeric layer is protected by Teflon coating of the toothed wheels, or by an accompanying film which is readily separable from the polymeric layer, against direct influence of heat to prevent any sticking. The film can be executed for example in about 10-50 μm PP or HDPE, since the homopolymers of these two polyolefins have only very low adherence to biodegradable plastics (e.g., polylactic acid, PLA, PBAT, PBSeT, PBSSe, PHA, PCL, PPC).

After fluting, the tips of the flutes are coated, via a sizing unit, with hot starch solution at about 80° C., with which the corrugated surface is subsequently joined to the upper linerboard layer. The same operation is subsequently carried out for the lower linerboard layer.

Further adhering operations to further combinations of linerboard layer and corrugated ply can follow to produce high-strength cardboards having multiple corrugated plies.

Instead of using starch it is also possible to use mixtures of starch and/or a filmable biodegradable dispersion such as a polyester-polyurethane dispersion (e.g., Luphen® D DS 3585) for the adhering. A further possibility consists in using a hotmelt adhesive instead of the starch system. Such corrugated fiberboards make it possible to improve the moisture resistance of the corrugated bond.

The bond between the corrugated web and the linerboard layer can also be produced using a corrugated ply whose outer layers are polymer coated. In such a case, it is merely the thermally induced adhering or welding of the polymeric surface of the corrugated web to the papery or polymeric surface of the linerboard layer which is possible.

The final cardboard web is subsequently cut into production-appropriate dimensions using automated cutting devices, folded, die-cut and processed into cardboard packaging.

The examples which follow elucidate the present invention without limiting it.

EXAMPLE 1

Two-Ply Flute

A) Production of Coated Paper:

The semicommercial coating rig (ER-WE-PA) consisted of a main extruder A (Reifenhäuser, 80 mm diameter—30 D) and 3 extruders (B, C, D) of 60 mm diameter/25 D length. With Ecoflex F BX 7011 (a polybutylene terephthalate adipate from BASF SE having an MVR of about 2.5 cm³/10 min, all the MVR values used in what follows were determined to EN ISO 1133 (190° C., 2.16 kg weight) it was possible to achieve a throughput of about 90 kg/h at 81 l/min. The throughput of the main extruder (Reifenhäuser, 80 mm diameter—30 D) was 190 kg/h at a speed of 77 l/min. The throughput of the extruders was varied to achieve very thin layers.

The coextrusion rig included a tool for die coextrusion which permitted a coextrusion of up to 7 layers at a die width of 1000 mm and an adjustable gap width of 0.5 mm. By means of inserts in the melt channel, different layers could be used together. The rig was equipped with a two-layer adapter insert (from Cloeren, with edge encapsulation) of the form AAABBBB with the main extruder as extruder A and a 60 extruder as extruder B. The outer layer A was run with 40% of the overall thickness, the inner layer B on the cardboard with 60% of the overall thickness.

The paper used was a corrugatable paper based on 100% wastepaper.

The paper was activated by a flame ionization unit (gas burner) or a corona discharge rig before coming into contact with the molten polymer.

All the coatings were extruded onto the cardboard at a melt temperature of 250° C. and a normal contact pressure on the chill roll of 4 bar. The web speed was varied between 30 m/min and 200 m/min. Higher speeds led to melt resonance on the semicommercial rig depending on the product.

Polyesters Used:

Polyester 1

Ecoflex® F BX 7011 (a polybutylene adipate coterephthalate from BASF SE) with an MVR of 2.5 cm³/10 min.

Polyester 2

A polybutylene terephthalate sebacate with an MVR of 6.4 cm³/10 min.

Polylactic Acid

NatureWorks® 3251 D from NatureWorks with an MVR (190° C., 2.16 kg to IS01133) of 30 ml/10 min.

Extrusion Coating

A compound of 24% polyester 2 16% polyester 1 and 60% polylactic acid was used in main and secondary extruders A and B. Melt temperature was 258° C.

At a maximum web speed of 170 m/min, an average layer thickness of 16.5 µm (~48% of the reference layer thickness) was obtained. The coating could only be detached with fiber rupture in the cardboard matrix. Flow instabilities such as increase and decrease of the throughput or dynamic variation of the melt web width (melt resonance) only occurred from 240 m/min. A particularly low neck-in was observed.

B) Production of Corrugated Ply

The paper-film assembly described under A) was fluted on a PTI Austria Huwell 2 corrugation rig using two intermeshing toothed wheels of the type A flute. For fluting, the polymeric layer was protected from direct effect of heat by Teflon coating to avoid any sticking of the film assembly to the toothed wheel. Fluting was done at 170° C.

Performance Characteristics

The moisture resistance of the flute was determined via the DIN EN ISO 7263 flat crush resistance (CMC) under a DIN EN 20187 standard atmosphere. The samples had the dimensions 160×12.7 mm and were measured with and without conditioning, i.e., 48 hours' storage at 30° C. and 90% relative humidity.

TABLE 1

Flat crush resistance

| Sample | CMT (N) | Strength loss |
|---|---|---|
| Uncoated paper measured directly | 70.7 | |
| Uncoated paper conditioned | 37.7 | 47% |
| Example 1 measured directly | 93.0 | |
| Example 1 conditioned | 64.0 | 32% |

The results in the table show that even the flute first single face coated with biodegradable polymer has distinctly higher wet strength than that without coating. In addition, the starting point is distinctly higher, so that altogether a distinctly stronger flute is obtained.

We claim:

1. A single- or double-faced corrugated fiberboard comprising one or more linerboard plies and one or more corrugated plies, wherein at least one of the linerboard plies or at least one of the corrugated plies is a paper-film assembly comprising:
    i) a 30 to 600 g/m² grammage papery material of construction as a layer, wherein said layer includes wastepaper to an extent in the range from 10 to 100%; and
    ii) a biodegradable polymeric coating from 1 to 100 µm in thickness.

2. The corrugated fiberboard according to claim 1, wherein the polymeric coating is one or more polymers selected from the group consisting of aliphatic polyester, aromatic polyester, polylactic acid, polyalkylene carbonate, polycaprolactone and polyhydroxyalkanoate and compounds thereof with natural polymers.

3. The corrugated fiberboard according to claim 1 wherein said layer of i) consist of 50 to 150 g/m² grammage paper.

4. The corrugated fiberboard according to claim 2, wherein the polymeric coating is selected from an aliphatic/aromatic polyester prepared from butanediol, terephthalic acid and one or more $C_6$-$C_{18}$ dicarboxylic acids.

5. The corrugated fiberboard according to claim 2, wherein the polymeric coating is selected from an aliphatic/aromatic polyester comprising:
    i) from 40 to 70 mo %, based on the components i to ii, of the one or more dicarboxylic acids, the dicarboxylic acids selected from the group consisting of succinic acid, adipic acid, sebacic acid, azelaic acid and brassylic acid,
    ii) from 60 to 30 mol %, based on the components i to ii, of a terephthalic acid derivative, and
    iii) from 98 to 102 mol %, based on the components i to ii, of a $C_2$-$C_8$ alkylene diol or $C_2$-$C_6$ oxyalkylene diol.

6. The corrugated fiberboard according to claim 2, wherein the polymeric coating is a copolymer mixture comprising:
    from 30% to 50% by weight of a biodegradable, aliphatic-aromatic polyester;

from 70% to 50% by weight of one or more polymers selected from the group consisting of polylactic acid and polyhydroxyalkanoate; and from 0% to 2% by weight of an epoxy-containing poly(meth)acrylate.

7. A single- or double-faced corrugated fiberboard comprising one or more linerboard plies and one or more corrugated plies, wherein at least one of the linerboard plies or at least one of the corrugated plies is a paper-film assembly comprising:

i) a 30 to 600 g/m$^2$ grammage papery material of construction as an outer layer, ii) a biodegradable polymeric coating from 1 to 100 μm in thickness as interlayer, and iii) a 30 to 600 g/m$^2$ grammage papery material of construction as an inner layer, wherein said layers i) and/or iii) includes wastepaper to an extent in the range from 10 to 100%.

8. The corrugated fiberboard according to claim 7, wherein the polymeric coating is one or more polymers selected from the group consisting of aliphatic polyester, aromatic polyester, polylactic acid, polyalkylene carbonate, polycaprolactone and polyhydroxyalkanoate and compounds thereof with natural polymers.

9. The corrugated fiberboard according to claim 7, wherein said layers i) and/or iii) consist of 50 to 150 g/m$^2$ grammage paper.

10. The corrugated fiberboard according to claim 8, wherein the polymeric coating is selected foiin an aliphatic/aromatic polyester prepared from butanediol, terephthalic acid and aliphatic $C_6$-$C_{18}$ dicarboxylic acids.

11. The corrugated fiberboard according to claim 8, wherein the polymeric coating is selected from an aliphatic/aromatic polyester comprising:

i) from 40 to 70 mo %, based on the components i to ii, of the one or more dicarboxylic acids, the dicarboxylic acids selected from the group consisting of succinic acid, adipic acid, sebacic acid, azelaic acid and brassylic acid, ii) from 60 to 30 mol %, based on the components i to ii, of a terephthalic acid derivative, and iii) from 98 to 102 mol %, based on the components i to ii, of a $C_2$-$C_8$ alkylene diol or $C_2$-$C_6$ oxyalkylene diol.

12. The corrugated fiberboard according to claim 8, wherein the polymeric coating is a copolymer mixture comprising:

from 30% to 50% by weight of a biodegradable, aliphatic-aromatic polyester;

from 70% to 50% by weight of one or more polymers selected from the group consisting of polylactic acid and polyhydroxyalkanoate; and from 0% to 2% by weight of an epoxy-containing poly(meth)acrylate.

* * * * *